United States Patent
Romero et al.

(10) Patent No.: US 10,048,069 B2
(45) Date of Patent: Aug. 14, 2018

(54) UTILITY LOCATING TOOL

(71) Applicants: Raul Romero, Kansas City, KS (US); Jeff Stacy, Kansas City, MO (US)

(72) Inventors: Raul Romero, Kansas City, KS (US); Jeff Stacy, Kansas City, MO (US)

(*) Notice: Subject to any disclaimer, the term of this patent is extended or adjusted under 35 U.S.C. 154(b) by 229 days.

(21) Appl. No.: 15/210,552

(22) Filed: Jul. 14, 2016

(65) Prior Publication Data

US 2017/0016722 A1  Jan. 19, 2017

Related U.S. Application Data (60) Provisional application No. 62/193,881, filed on Jul. 17, 2015.

(51) Int. Cl.
   *G01C 15/04* (2006.01)

(52) U.S. Cl.
   CPC .................................. *G01C 15/04* (2013.01)

(58) Field of Classification Search
   CPC .... G01C 15/04; G01C 15/004; G01C 15/006; G01C 15/06
   USPC ... 33/228, 1 G, 1 CC, 285, 286, DIG. 21, 34
   See application file for complete search history.

(56) References Cited

U.S. PATENT DOCUMENTS

| | | | |
|---|---|---|---|
| 3,588,255 A | 6/1971 | Alexander | |
| 3,775,929 A * | 12/1973 | Roodvoets | E04F 21/1838 33/286 |
| 3,907,435 A * | 9/1975 | Roodvoets | G01B 11/272 250/203.1 |
| 4,319,406 A * | 3/1982 | Pehrson, Sr. | G01B 5/25 33/286 |
| 4,681,439 A | 7/1987 | Shoemaker | |
| 4,993,160 A * | 2/1991 | Fraley | G01C 15/02 33/286 |
| 5,484,026 A * | 1/1996 | Susaki | B25B 21/00 173/11 |
| 5,551,159 A * | 9/1996 | Mooty | G01C 15/002 33/228 |
| 5,907,907 A | 6/1999 | Ohtomo et al. | |
| 6,455,806 B1 | 9/2002 | Jendick | |
| 6,628,378 B1 * | 9/2003 | Marangoni | G01B 11/27 33/286 |
| 7,372,247 B1 * | 5/2008 | Giusti | G01V 15/00 324/326 |
| 7,434,322 B2 | 10/2008 | Walser et al. | |

(Continued)

FOREIGN PATENT DOCUMENTS

| | | |
|---|---|---|
| EP | 773505 A2 | 5/1997 |
| EP | 2359091 B1 | 6/2010 |

(Continued)

*Primary Examiner* — Christopher Fulton
(74) *Attorney, Agent, or Firm* — Hovey Williams LLP (57) ABSTRACT

A ground surface marking system including a beam transmitter configured to emit electromagnetic radiation and a distal target. The distal target is oriented to be impacted along a first target surface by at least a portion of the electromagnetic radiation. The distal target is mounted on a target stand configured for adjustment with respect to a vertical axis. The system also includes a target applicator having a second target surface, a base including a shaft, and a container attached to the base and configured to hold and dispense markers for placement along the ground surface extending between the beam transmitter and the distal target.

20 Claims, 6 Drawing Sheets

(56) References Cited

U.S. PATENT DOCUMENTS

| | | | |
|---|---|---|---|
| 7,987,605 B2 | 8/2011 | Fleenor et al. | |
| 7,990,550 B2 | 8/2011 | Aebischer et al. | |
| 8,404,301 B2 | 3/2013 | Schneider | |
| 9,233,751 B2 | 1/2016 | Metzler | |
| 9,341,473 B2 | 5/2016 | Zogg et al. | |
| 2007/0044536 A1* | 3/2007 | Gunsaulis | E21B 7/04 73/1.79 |
| 2009/0064527 A1* | 3/2009 | Weavers | E01C 23/163 33/775 |
| 2010/0272885 A1* | 10/2010 | Olsson | B65D 83/203 427/137 |
| 2013/0276315 A1* | 10/2013 | Kahle | G01C 15/06 33/228 |
| 2015/0330039 A1* | 11/2015 | Vanneman | E01C 23/163 404/94 |
| 2016/0115656 A1 | 4/2016 | Allega | |

FOREIGN PATENT DOCUMENTS

| | | |
|---|---|---|
| WO | 2005/012834 A1 | 2/2005 |
| WO | 2006/013386 A2 | 2/2006 |

* cited by examiner

UTILITY LOCATING TOOL

CROSS-REFERENCE TO RELATED APPLICATION

This patent application claims priority to U.S. Patent Application Ser. No. 62/193,881 filed Jul. 17, 2015, and titled UTILITY LOCATING TOOL, the contents of which is incorporated herein by reference in its entirety.

BACKGROUND

1. Field

The present inventive concept relates generally to a system and method for marking a ground surface. The present inventive concept relates more specifically to a system and method for marking locations along a ground surface using a handheld target applicator aligned by a beam transmitter.

2. Discussion of Related Art

The locations of underground utility lines are rarely recorded in detail upon installation. Moreover, utility lines are subject to periodic relocation and maintenance, and resulting new locations are also unlikely to be recorded in detail. Utility lines are therefore traditionally located and temporarily marked each time ground or maintenance work is planned in the surrounding area. Markers applied to the overlying surface of the ground may include paint, flags, stakes and other known substances and devices.

Utility lines containing or adjacent to metal wires or other structure exhibiting conductive properties may be located by handheld receivers configured to detect the conductive structure(s). Acoustic and radar location devices are also available, though these technologies are often expensive to employ and/or are ineffective at depths greater than a few feet.

Where utility lines do not include and are not adjacent to conductive structures, affordable and effective location options can therefore be limited. For example, storm sewer conduits and similar underground utilities often do not include conductive structures detectable by the conductive material-reliant technologies outlined above. Acoustic and radar location devices may be deemed too costly or time intensive, and/or may be incapable of detection at the required depth(s), for location of such storm sewer conduits or similar utility lines. Typically, such a utility line is marked by an operator walking a straight line between manhole covers or other easily-identifiable landmarks associated with the line, marking the ground along the way. However, this method often results in inaccurate marking that deviates from the permitted tolerance for utility location, particularly where a significant distance separates the manhole covers or other landmarks.

SUMMARY

The following brief description is provided to indicate the nature of the subject matter disclosed herein. While certain aspects of the present inventive concept are described below, the summary is not intended to limit the scope of the present inventive concept.

The present inventive concept provides, in its simplest form, an improved system and method for marking locations along a ground surface using a handheld target applicator aligned by a beam transmitter.

The aforementioned may be achieved in one aspect of the present inventive concept by providing a system for marking an underground utility line including a beam transmitter configured to emit electromagnetic radiation. The system also includes a distal target oriented to be impacted along a first target surface by at least a first portion of the electromagnetic radiation. The distal target is mounted on a target stand configured for adjustment with respect to a vertical axis. The system also includes a target applicator having a second target surface, a base having a shaft, and a container attached to the base and configured to hold and dispense markers for placement along a ground surface that extends between the beam transmitter and the distal target.

The aforementioned may be achieved in another aspect of the present inventive concept by providing a target applicator for positioning between a beam transmitter that emits electromagnetic radiation and a distal target oriented to be impacted along a first target surface by at least a portion of the electromagnetic radiation. The target applicator includes a second target surface, a base having a shaft, and a container attached to the base and configured to hold and dispense markers for placement along a ground surface that extends between the beam transmitter and the distal target.

The aforementioned may be achieved in still another aspect of the present inventive concept by providing a method for marking an underground utility line. The method includes locating a first reference location along a ground surface above the utility line. The method also includes locating a second reference location along the ground surface above the utility line and spaced from the first reference location. A beam transmitter is provided that is configured to emit electromagnetic radiation. The method includes placing the beam transmitter substantially above the first reference location. A distal target including a first target surface is also provided and is mounted on a target stand configured for adjustment along a vertical axis. The method includes placing the distal target substantially above the second reference location and orienting the first target surface to face the beam transmitter. The method further includes adjusting the target stand with respect to the vertical axis until the first target surface is impacted by at least a portion of the electromagnetic radiation. A target applicator having a second target surface is also provided. The method includes placing the target applicator between the beam transmitter and the distal target and aligning the second target surface with at least a portion of the electromagnetic radiation. The method further includes actuating a container to release a marker for placement along the ground surface.

Additional aspects, advantages, and utilities of the present inventive concept will be set forth in part in the description which follows and, in part, will be obvious from the description, or may be learned by practice of the present inventive concept.

BRIEF DESCRIPTION OF THE DRAWINGS

Embodiments of the present inventive concept are described in detail below with reference to the attached drawing figures, wherein.

The drawing figures do not limit the present inventive concept to the specific embodiments disclosed and described herein. The drawings are not necessarily to scale, emphasis instead being placed upon clearly illustrating the principles of the present inventive concept.

DETAILED DESCRIPTION

The following detailed description of the inventive concept references the accompanying drawings that illustrate specific embodiments in which the inventive concept can be practiced. The embodiments are intended to describe aspects of the inventive concept in sufficient detail to enable those skilled in the art to practice the inventive concept. Other embodiments can be utilized and changes can be made without departing from the scope of the present inventive concept. The following detailed description is, therefore, not to be taken in a limiting sense. The scope of the present inventive concept is defined only by the appended claims, along with the full scope of equivalents to which such claims are entitled.

In this description, references to "one embodiment", "an embodiment", or "embodiments" mean that the feature or features being referred to are included in at least one embodiment of the technology. Separate references to "one embodiment", "an embodiment", or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments, but is not necessarily included. Thus, the present technology can include a variety of combinations and/or integrations of the embodiments described herein.

Figure 1:
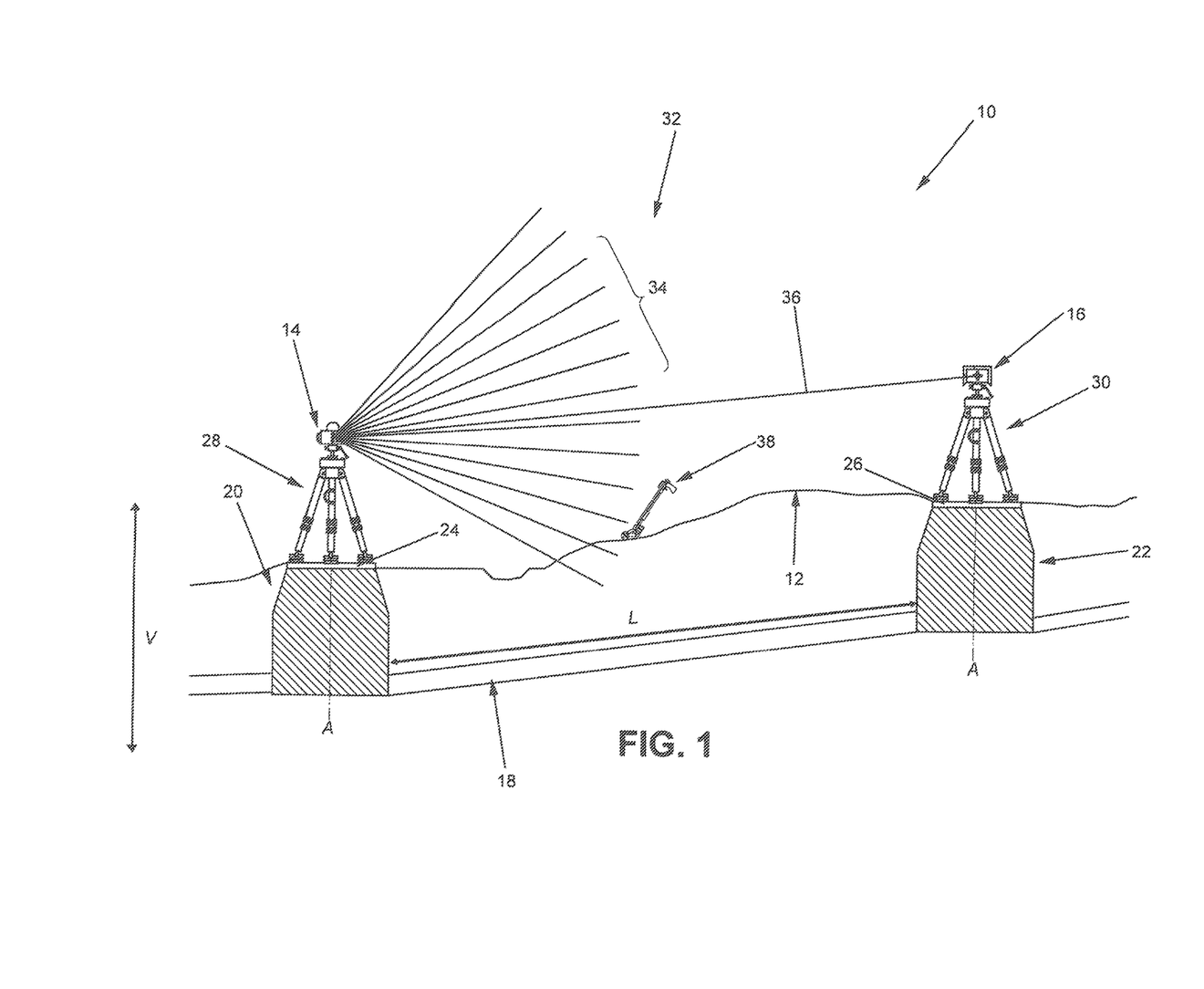
FIG. 1 is a partially subterranean side view of a system for marking a ground surface between a beam transmitter and a distal target, the system including a target applicator constructed according to a first embodiment of the present inventive concept.

FIG. 1 illustrates a system 10 for marking a ground surface 12 extending between a beam transmitter 14 and a distal target 16. The objective of marking system 10 is to place one or more markers (not shown) along the ground surface 12 directly above an imaginary laterally centered line or lines extending along a length L of an underlying buried utility line 18. Preferably, the ground surface 12 is marked at several locations spaced along the length L of the utility line 18. The markers may comprise any of a variety of suitable substances or structures which may be dispensed from a handheld device, such as paint, flags, stakes and the like. The utility line 18 may be a storm or sanitary sewer conduit such as a force main line, or another type of utility line.

In the embodiment of FIG. 1, the utility line 18 was presumably buried without associated locatable conductive structure, essentially proscribing cost effective means for detecting a lateral center line for the utility line 18 along its entire length L. Nonetheless, the lateral center line of the utility line 18 may reasonably be presumed to intersect central axes A of manholes 20, 22. In turn, central axes A may reasonably be presumed to intersect center points (not shown) of substantially circular manhole covers 24, 26 sitting atop the manholes 20, 22. Therefore, the center points of manhole covers 24, 26 are preferably utilized respectively as first and second reference locations for centering beam transmitter 14 and distal target 16 along the lateral center line of the utility line 18. However, it is foreseen that other methods for determining endpoints of a lateral center line or lateral center lines for use as reference locations may be utilized, according to the knowledge of one having ordinary skill in the art, without departing from the spirit of the present inventive concept. For instance, endpoints for a marking route may be identified for determination of reference locations through spotting landmark structures typically found near utility lines, such as storm sewer boxes or curb inlets, junction boxes, valves, air releases, outlet structures and/or other landmark structures or ground formations manually identified by an operator.

The beam transmitter 14 and distal target 16 are each mounted respectively on adjustable transmitter and target stands 28, 30, which are preferably of substantially similar construction (as described in more detail below). The beam transmitter 14 is configured to emit electromagnetic radiation 32 in a plurality of beams 34 and a beam 36. The plurality of beams 34 diverge to form a fan shape in a substantially vertical reference plane. The beam 36 extends between the beam transmitter 14 and the distal target 16 as described in more detail below.

A target applicator 38 is positioned along the ground surface 12 between the beam transmitter 14 and the distal target 16. In a marking process, the target applicator 38 traverses the undulating ground surface 12 while remaining substantially in lateral alignment with beams 34 in the substantially vertical reference plane. As the target applicator 38 traverses the ground surface 12 between the beam transmitter 14 and the distal target 16, a plurality of markers (not shown) are dispensed and spaced along the ground surface 12 above the center line of the utility line 18.

Preferably, "substantially in lateral alignment" encompasses any lateral deviation of the markers of less than about two feet (2') from the vertical reference plane (i.e., deviation of less than about two feet (2') in a direction normal to the vertical reference plane). As will be apparent to one having ordinary skill upon review of this disclosure, it is preferable to maintain substantially vertical alignment of the target applicator 38 above a point of marker dispensation. One or more level bubbles or gyroscopes may be mounted to the target applicator 38 to assist in maintaining vertical alignment. Such alignment may increase the efficacy of utilizing the beams 34, 36 for purposes of centering on the center line of the utility line 18. It will also be apparent to one having ordinary skill that perfect collimation within a vertical plane or any other plane cannot be reasonably expected, and that some lateral divergence of beams 34 and/or beam 36 from the vertical reference plane is likely, particularly over longer distances. It will therefore be understood that proper preparation and marking technique are to be utilized to maximize the distance that may be accurately marked between the beam transmitter 14 and distal target 16. Preferably, the systems 10 and 40 may be used for appropriately accurate marking of distances between about two hundred and about five hundred feet (200-500').

In preparation for marking by the target applicator 38, the heights of the beam transmitter 14 and the distal target 16 are adjusted so that beam 36 is above the target applicator 38. It should be noted that adjustment "with respect to" or "along" a vertical axis V merely connotes an adjustment movement having a vertical component, and does not require that the movement occur substantially in parallel with the vertical axis V. The beam transmitter 14 is also preferably leveled before the marking ensues, at least to ensure beams 34 are emitted in the substantially vertical reference plane, as described in more detail below.

In this manner, a target surface (see FIG. 6) of the target applicator 38 may traverse substantially the entire length of the ground surface 12 extending between the beam transmitter 14 and distal target 16 in alignment with at least a portion of the beams 34, but without interfering with and preventing the beam 36 from hitting distal target 16. This improvement reduces the chances that a change in the directionality of the electromagnetic radiation 32 occurring after initial setup will go unnoticed and lead to errant marking.

Figure 2:
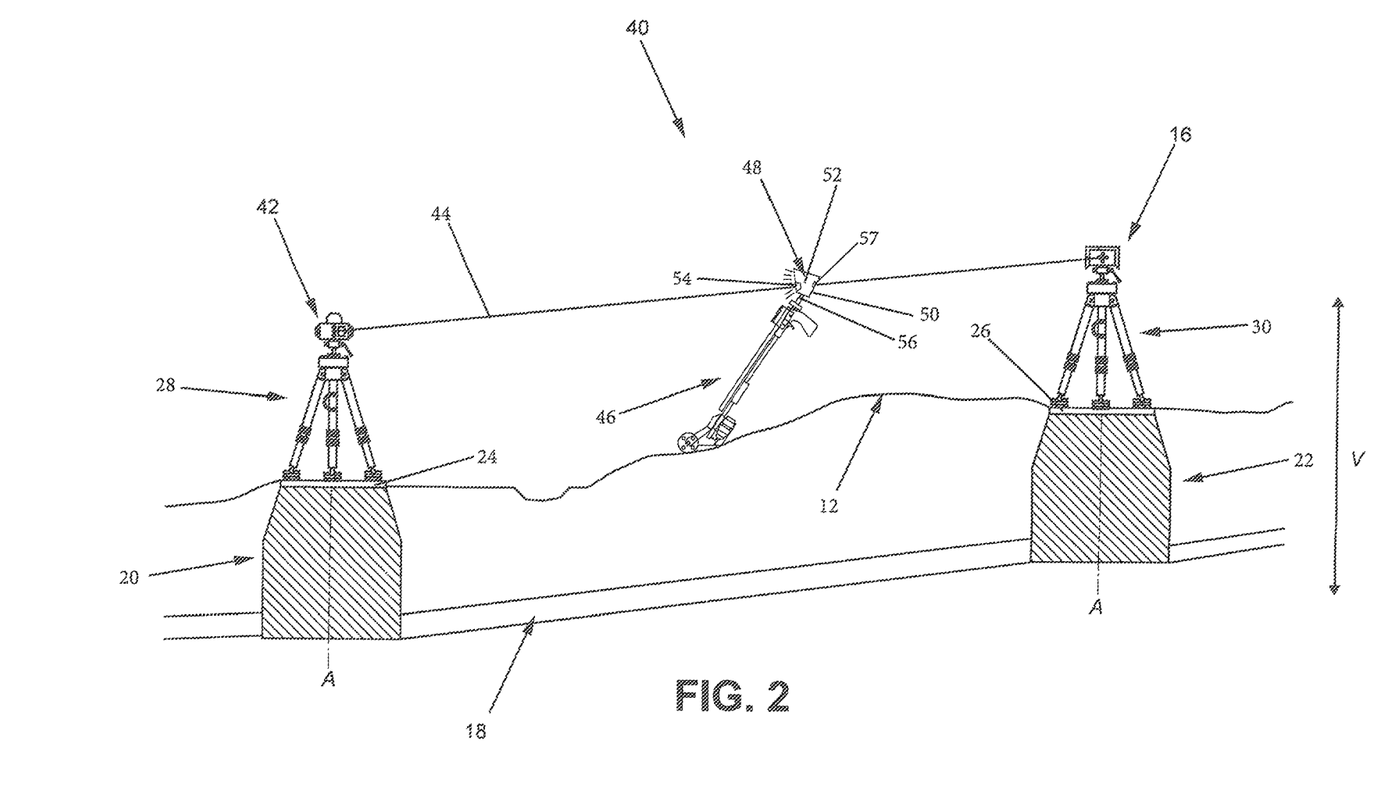
FIG. 2 is a partially subterranean side view of a system for marking a ground surface between a beam transmitter and a distal target, the system including a target applicator constructed in accordance with a second embodiment of the present inventive concept.

Turning now to FIG. 2, a system 40 for marking a ground surface 12 extending between a beam transmitter 42 and distal target 16 is illustrated. Beam transmitter 42 is of substantially identical construction to beam transmitter 14, except as otherwise noted and/or illustrated herein. The beam transmitter 42 and distal target 16 are centered on manhole covers 24, 26 according to the description of FIG. 1 set forth above. The beam transmitter 42 is configured to emit electromagnetic radiation in a beam 44 extending toward the distal target 16. A target applicator 46 is positioned between the beam transmitter 42 and distal target 16.

Target applicator 46 is of substantially identical construction to target applicator 38, except as otherwise noted herein. The target applicator 46 includes a target 48 having a target surface 50 protected by a hood 52. A sight window 54 extends through the hood 52, permitting an operator to view the target surface 50 by peering through the sight window 54 from outside the hood 52.

The target 48 is mounted on an adjustable target applicator stand 56 including a plurality of concentrically fitted cylindrical tubes. The target applicator stand 56 is extendable and retractable along a longitudinal axis of the target applicator 46 by moving at least two of the tubes relative to one another in a telescoping movement. It is also foreseen that the target 48 may be mounted on various other known adjustable stands permitting adjustment along the longitudinal axis or otherwise with respect to the vertical axis V without departing from the spirit of the present inventive concept.

In a marking process, the target applicator 46 traverses the undulating ground surface 12 while target 48 remains substantially in lateral and vertical alignment with beam 44. As the target applicator 46 traverses the ground surface 12 between the beam transmitter 42 and the distal target 16, a plurality of markers (not shown) are dispensed and spaced along the ground surface 12 above the center line of the utility line 18.

Preferably, "substantially in vertical alignment" encompasses any deviation that does not remove the entirety of beam 44 from the target surface 50. Substantial vertical alignment is preferably maintained in the illustrated embodiment using the target applicator stand 56 to adjust the height of the target 48 to account for varying elevations of the undulating ground surface 12. However, it is foreseen that embodiments of the target applicator may omit structure (i.e., a wheel) for contacting the ground surface and/or may omit an adjustable target applicator stand, and that in any case the operator may simply heft or lower the target applicator at various locations along the ground surface to achieve substantial vertical alignment for marking.

The target applicator 46 may be periodically removed from the path of the beam 44—thereby permitting beam 44 to hit the distal target 16—to ensure proper directionality of the beam 44 throughout the course of a marking process. Moreover, the target surface 50 may include at least one aperture 57 and/or may comprise partially translucent material, in either case to permit at least a portion of the beam 44 to hit the distal target 16 even while the target applicator 46 is in substantial lateral and vertical alignment with the beam 44 and is sensing and/or reflecting other portion(s) of the beam 44 to indicate proper alignment.

Figure 3:
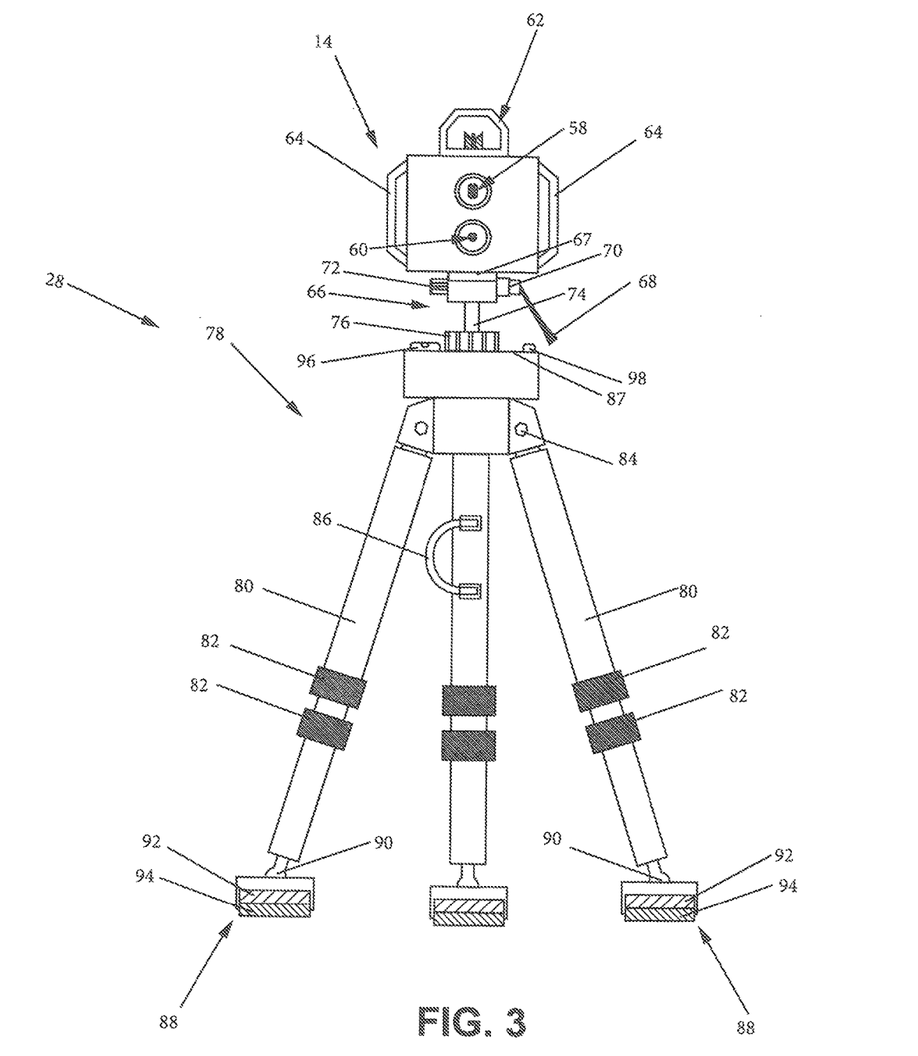
FIG. 3 is a detailed front perspective view of the beam transmitter of FIG. 1.

Turning now to FIG. 3, the beam transmitter 14 and transmitter stand 28 are illustrated in additional detail. Beam transmitter 14 includes a first output optic 58 configured to emit electromagnetic radiation comprising the plurality of divergent beams 34 extending away from the first output optic 58 and forming a fan shape substantially collimated in the vertical reference plane (see FIG. 1). Beam transmitter 14 also includes a second output optic 60 configured to emit electromagnetic radiation in static reference beam 36.

The preferred embodiment of beam transmitter 14 therefore includes two output optics 58, 60, respectively configured to emit plurality of beams 34 in a fan pattern and static reference beam 36 in a marking process, as detailed above and illustrated in FIG. 1. Preferably, the output optics 58, 60 are in vertical alignment or are only slightly offset laterally from each other (for example to reduce interference between the electromagnetic radiation, where applicable) and are oriented to emit their respective beams such that the substantially vertical reference plane is substantially parallel to the static reference beam. Such alignment and orientation may minimize the lateral variability of the beams, which preferably project in the same vertical plane or in two vertical planes with minimal lateral spacing.

Distributing fanning and static reference beam functions across two output optics 58, 60 may provide advantages in certain embodiments of the present inventive concept. For instance, the type, color, intensity or other properties of beams 34 and beam 36 may be varied independently. Independent variability of these properties may, for example, permit optimization of beams 34 for visibility on retro-reflective material of the target applicator 38 that is not covered by a hood or shade, while also permitting optimization of beam 36 for visibility at a greater distance on a hooded or shaded portion of distal target 16. For another example, beams 34 and beam 36 may be pulsed independently in different patterns according to their differing purposes. Preferably, two separate beam generators supply electromagnetic radiation to the output optics 58, 60. Nonetheless, it is foreseen that the same output optic and/or beam generator may be used to emit both the fanning beams and the static reference beam without departing from the spirit of the present inventive concept. Moreover, it is foreseen that output optics may be removable from and/or interchangeable on the beam transmitter, for example where a highly collimated beam lens is detachable and replaceable with an optical diffuser type output optic for forming a vertically fanned beam or beams, without departing from the spirit of the present inventive concept.

The electromagnetic radiation emitted in beams 34 and/or 36 is/are preferably within the laser light portion of the electromagnetic spectrum, and more preferably the beam generator(s) of the beam transmitter is/are of a green laser variety. However, it is foreseen that other types of laser light, and indeed even non-laser electromagnetic radiation such as infrared radiation, may be utilized without departing from the spirit of the present inventive concept.

Returning to FIG. 3, the beam transmitter 14 includes an alignment sight 62 having a magnifying optic of sufficient power to spot beam 36 impacting a surface of the distal target 16. The power of the magnifying optic may be adjustable to account for varying distances from the distal target 16. Preferably, the alignment sight 62 has a magnifying optic sufficient to closely inspect a target surface (see FIG. 5) at a distance of about five hundred feet (500') during full sunlight in order to spot beam 36. The alignment sight 62 preferably also includes crosshairs or the like superimposed on the image viewed by an operator, the crosshairs being configured to help an operator quickly estimate a location where beam 36 is likely to impact or to be centered on that location. The crosshairs are also preferably adjustable for distance. The beam transmitter 14 also includes handles 64 for manual manipulation and adjustment of the beam transmitter 14 on stand 28 with respect to all three axes, as described in more detail below.

Beam transmitter 14 is mounted on a neck 66 of transmitter stand 28. Neck 66 includes a top plate 67 fixed to a quick release plate (not shown) of the beam transmitter 14. A lever release 68 can be manually manipulated to release the beam transmitter 14 for coarse adjustment by swiveling about the neck 66, and more particularly by rotation about a vertical axis and/or about a horizontal axis. The lever release 68 may be re-engaged to secure the beam transmitter 14 following coarse adjustment. Knobs 70, 72 may be rotated respectively for fine adjustment about vertical and horizontal axes. The neck 66 also includes a column 74 supporting the top plate 67 and beam transmitter 14. A geared extension 76 may be rotated about the vertical axis to extend or retract the column 74 vertically to increase or decrease the height of the beam transmitter 14.

Transmitter stand 28 also includes a trunk 78 comprising at least three legs 80 having a plurality (e.g., three) of leg extension sections and lever leg extension locks 82 for secure height adjustments of the beam transmitter 14 through extension and retraction of the extension sections relative to one another. The legs 80 are preferably attached to a common segment of trunk 78 at hinges 84, enabling the legs 80 to be folded and optionally locked together for transport and/or storage. The legs 80 may be folded approximately one hundred and eighty degrees (180°) to surround beam transmitter 14 in certain embodiments, in order to reduce damage to the beam transmitter 14 during transport and/or storage.

The trunk 78 additionally includes a carrying and adjustment handle 86 affixed to one of the legs 80. A hook (not shown) may also be fixed to the underside of the common segment for optionally receiving a weight for further stabilization of the beam transmitter 14 and/or a plumb bob for use in levelling the stand 28 and/or beam transmitter 14. The common segment includes a top surface 87.

The transmitter stand 28 also includes feet 88. Feet 88 preferably swivel about terminal segments 90 of legs 80, more particularly by rotating about a vertical axis and/or about a horizontal axis, enabling secure placement on uneven terrain where needed. Each foot 88 preferably includes a laminated portion comprising an upper, magnetic layer 92 and a lower, elastomeric polymer layer 94 preferably comprising a non-slide rubber pad or other such material presenting a high coefficient of friction against metal surfaces and the like. The feet 88 therefore are magnetically attracted to manhole covers 24, 26—which typically comprise ferromagnetic metal such as iron—and are firmly rooted against sliding by virtue of high-friction layers 94.

Transmitter stand 28 is adjustable to raise or lower the beam transmitter 14, as described in more detail above. It is preferable for the top plate 67 bearing the beam transmitter 14 and the top surface 87 to be substantially parallel with a horizontal plane that is normal to a vertical and plumb axis V. The hinged and extendable legs 80 may be individually adjusted, and bubble levels 96, 98 (respectively extending along x- and z-axes as illustrated in FIG. 3) may be periodically consulted until the top surface 87 is determined to be substantially level. Coarse and fine adjustment as well as height adjustment of the beam transmitter 14 is preferably undertaken after leveling of the top surface 87. In a preferred embodiment, the top surface 87 is adjustable to between about twenty four and about sixty inches (24-60") above feet 88, and the column 74 may be raised or lowered to adjust the top plate 67 up to about eleven inches (11") above the top surface 87.

Figure 4:
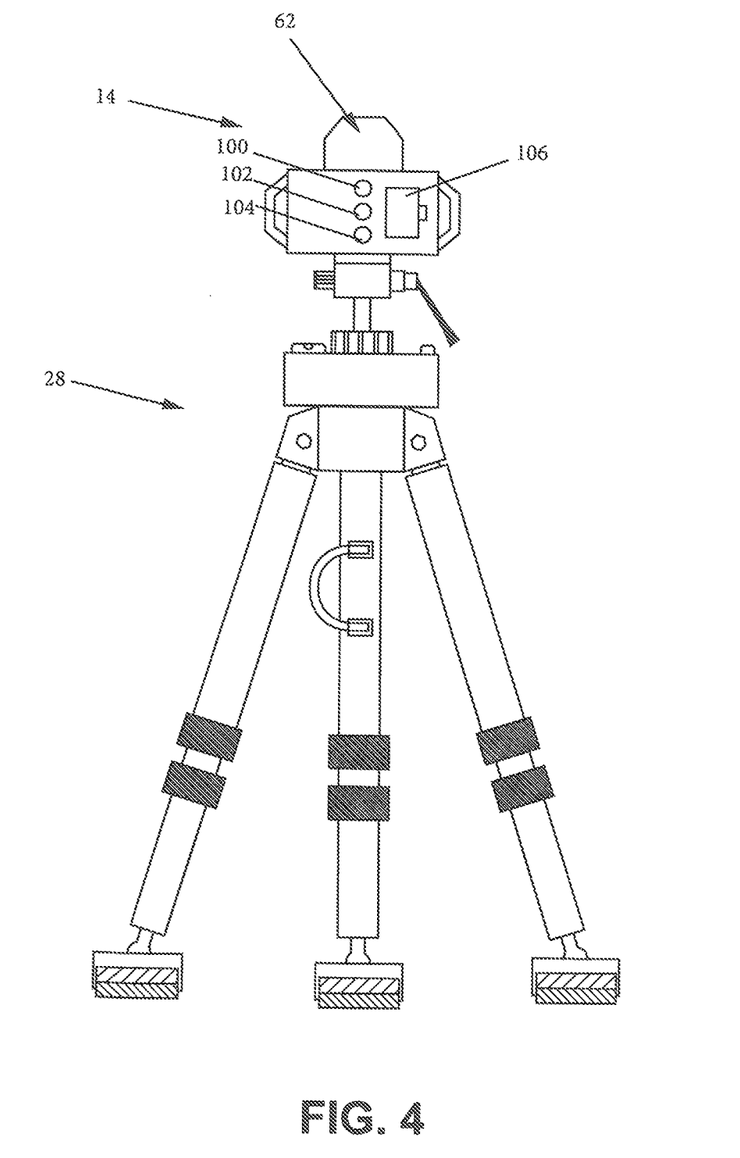
FIG. 4 is a perspective view of the beam transmitter of FIG. 3, the beam transmitter having been rotated one hundred and eighty degrees (180°) on a transmitter stand to present a view of a rear side of the beam transmitter.

Turning briefly to FIG. 4, the rear of the beam transmitter 14 includes simple control elements for the beam transmitter 14, preferably including "on" button 100, "off" button 102, and intermittent flash or pulse button 104. The intermittent flash setting may aid in spotting the beam 36 illuminating the distal target 16 in unusually bright ambient conditions. A removable panel 106 covers a battery compartment for housing batteries that power the beam transmitter 14. It is foreseen that other control elements known to one of ordinary skill may be presented on a digital and/or touch screen display, and may be otherwise employed without departing from the spirit of the present inventive concept. Further, it is foreseen that alternating current sources and wired power ports may be employed to power the beam transmitter 14 without departing from the spirit of the present inventive concept.

Figure 5:
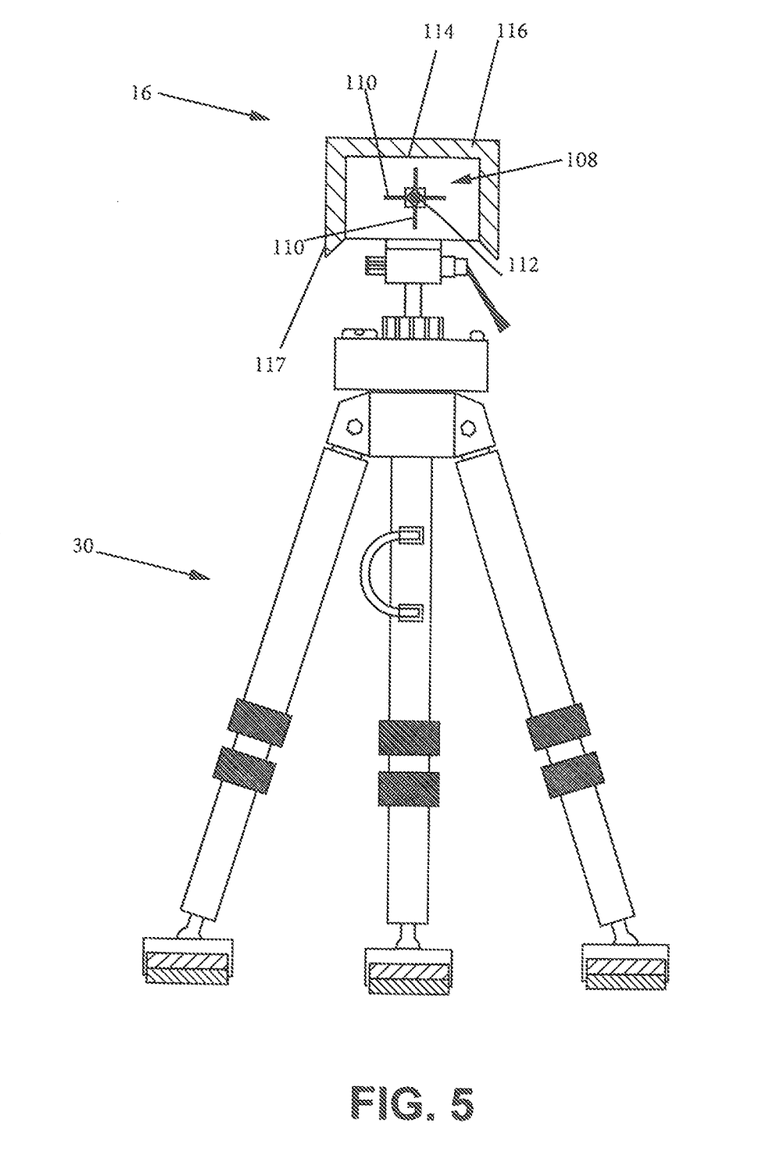
FIG. 5 is a detailed front perspective view of the distal target of FIG. 1.

Turning now to FIG. 5, distal target 16 and target stand 30 are illustrated in additional detail. Target stand 30 is of essentially identical construction to transmitter stand 28, and its features will therefore not be described in detail again here. Distal target 16 includes a substantially planar target surface 108 having crosshairs 110 centered thereon. Target surface 108 is preferably about twenty five to thirty six square inches (25-36 in.$^2$), though its dimensions may be varied according to the application and desired targeting leniency. Centered within the crosshairs 110 is a small photodiode array 112 configured to generate an electrical signal when impacted by beam 36, the electrical signal triggering an audible or visual indicator of the impact. For example, a strobe light may be mounted on the distal target 16 and may illuminate in response to a signal from photodiode array 112. It is foreseen that the small photodiode array 112 may be expanded to occupy a greater proportion of the target surface 108 without departing from the spirit of the present inventive concept.

The target surface 108 has an uppermost edge 114 and is substantially surrounded on three sides by a hood 116. The hood 116 provides protection against ambient light interfering with spotting beam 36 as it impacts the target surface 108, and preferably includes an outermost edge 117 furthest from the target surface 108. The outermost edge 117 is preferably raised about three inches (3") from the target surface 108. The distal target 16 may include a digital and/or touchscreen display and/or an audio speaker (not shown) for emitting the audible and/or visual indicator of impact. The distal target 16 may also include an embedded transceiver or transmitter (not shown) for transmitting timestamped beam 36 impact data, for example to one or more processors embedded in the target applicator 38 and/or beam transmitter 14 (see discussion below).

The target surface 108 preferably comprises a retro-reflective or other photosensitive surface, such as a glass bead or microprism surface, configured to enhance visual detection of electromagnetic radiation of an impacted beam 36 reflecting off the target surface 108. The retro-reflective or other photosensitive surface may be an adhesively applied layer fixed to a backing portion of the distal target 16. It is foreseen that such photosensitive material and the photodiode array 112 may be each be used exclusive of the other or in combination without departing from the spirit of the present inventive concept.

Figure 6:
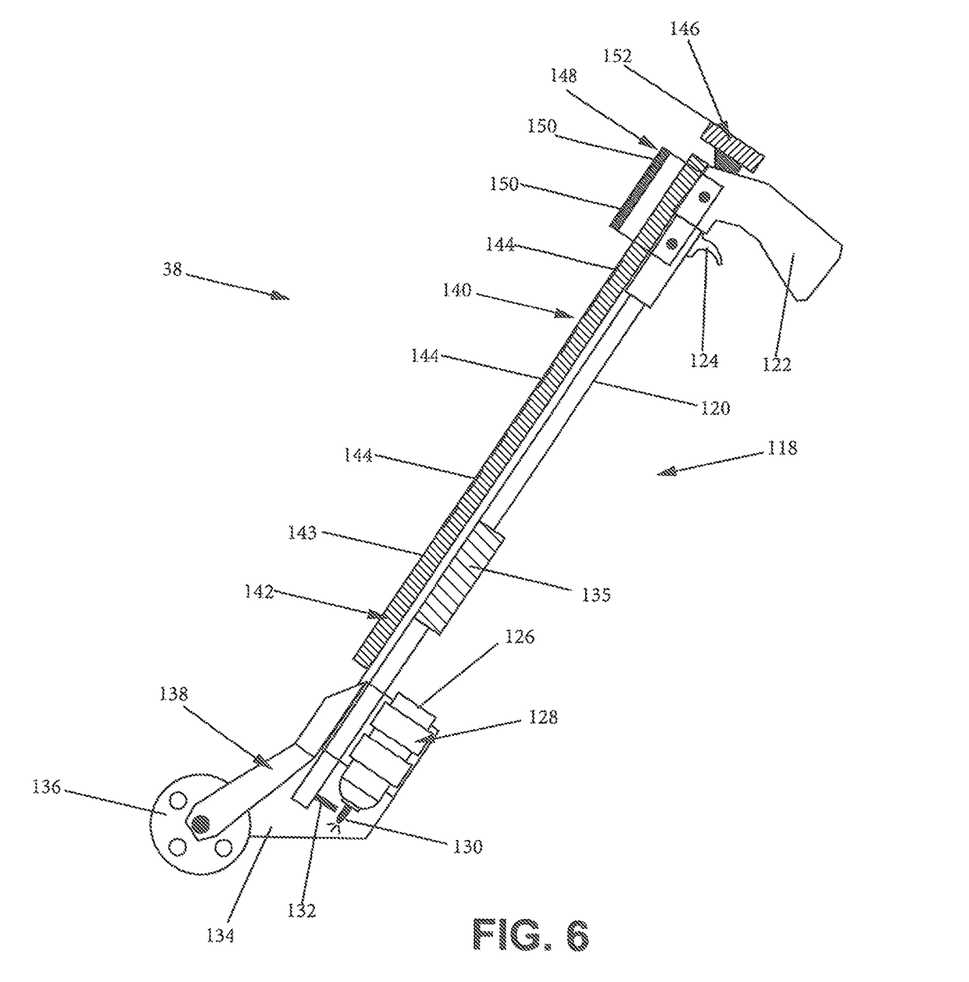
FIG. 6 is a detailed left side perspective view of the target applicator of FIG. 1.

Turning now to FIG. 6, target applicator 38 is illustrated in additional detail. A base 118 includes a shaft 120 extending most of the length of the target applicator 38. In a preferred embodiment, the shaft 120 is approximately thirty inches (30") long. Fixed to and extending from a first side of the base 118 is a handle 122 including an actuator 124 in a common finger trigger configuration. Along a bottom end of the target applicator 38, a container 126 is fixed to the base 118 by a bracket 128. Container 126 is configured to contain and dispense markers along the ground surface 12 (see FIG. 1), and is illustrated as a paint can containing pressurized paint contents. Container 126 includes a marker dispenser 130 configured as a common spray nozzle. In embodiments where the marker used is a stake or flag, it is foreseen that the marker dispenser may comprise an arm or a piston driven to compel the stake or flag downward to be embedded in the ground surface 12.

Marker dispenser 130 is actuated to dispense the contents of the container 126 by being bent about the body of the container 126 by actuator arm 132. Actuator arm 132 is in driven communication with actuator 124 via a drive chain running substantially along the length of the target applicator 38 (not shown). The container 126 is preferably covered along its sides by a right container guard 134 and a left container guard (not shown), each of which is fixed to base 118. The target applicator 38 also preferably includes a pin holder tube 135 fixed to base 118 and configured for holding pin marking flags an operator may manually remove and drive into the ground surface 12.

The target applicator 38 preferably includes a detachable wheel 136 rotatably fixed to base 118 by angle bracket 138. Angle bracket 138 may be detachably fixed to base 118 by a variety of fasteners, including a snap-fit bracket or a removable pin. The wheel 136 preferably rolls along the ground surface 12 during a marking process to support the remainder of the target applicator 38. The wheel 136 may drive a simple mechanical and/or electrical counter (not shown) configured to track distance traveled by the wheel 136. Where the counter produces an electrical signal in response to rotation of the wheel 136, the counter preferably includes a transmitter for transmitting the electrical signal to the processor of panel 146 for processing (see discussion below).

The target applicator 38 is guided as it traverses the ground surface 12 between the beam transmitter 14 and the distal target 16 through lateral alignment of a target 140 with beams 34 of the vertical reference plane. Target 140 preferably comprises a plastic base 142, which may be approximately two inches (2") wide and about fifteen inches (15") long in a preferred embodiment. An outer target surface 143 preferably extends along substantially the entire length of the plastic base 142, and includes an adhesively-applied retro-reflective or other photosensitive surface configured to enhance visual detection of impacted beams 34 reflecting off the target 140. Target 140 also preferably comprises a plurality of photodiodes or phototransistors 144 embedded in the plastic base 142 and facing outward to form a part of the outer target surface 143. A single column of eight photodiodes 144 having substantially flat faces are illustrated in FIG. 6. Photodiodes 144 and at least a portion of the photosensitive surface preferably together present a substantially planar portion of outer target surface 143 that is substantially parallel to a front face of the shaft 120. It is foreseen that the target surface 143—including, for example, both photosensitive retro-reflective surface(s) and photodiode(s)—may be positioned along the same side of shaft 120 as handle 122, without departing from the spirit of the present inventive concept.

Each of the photodiodes 144 is configured to generate an electrical signal when impacted by one or more of beams 34, the electrical signal triggering an audible or visual indicator of the impact at a panel 146. It is foreseen that the photodiodes 144 may form an array extending along more or less of the length of base 142, may be more or less numerous, and may form more columns across the width of base 142, without departing from the spirit of the present inventive concept. Where the preferred single column of circular photodiodes 144 extends along the base 142 having a width of about two inches (2"), each photodiode 144 is preferably centered across the width of the base 142 and is approximately one and a half inches (1.5") in diameter.

The panel 146 may include a digital display or touchscreen and an audio speaker. It is foreseen that the photosensitive surface and the photodiodes 144 described above may each be used exclusive of the other or in combination without departing from the spirit of the present inventive concept. The panel 146 may include a processor and associated non-transient memory. The non-transient memory may store a software program containing instructions directing the processor to generate signals for controlling the generation of audible or visible alerts upon receipt of corresponding signals from the photodiodes 144 by the display and/or audio speaker. The type and volume of alert indicator(s), their frequency, the brightness or configuration of characters presented at the digital display, and other settings may be controlled according to the instructions of the program, alone or in combination with input from an operator.

Moreover, the processor may be in electrical communication with a wireless transceiver for sending and receiving data transmissions and instructions for execution remotely and/or by the processor. In this manner, the processor may instruct transmission of time data, position data, shaft orientation data (preferably, the target applicator is equipped with a gyroscope or the like in electrical or wireless communication with the panel 146), timestamped beam impact data, and other relevant information gathered at the target applicator 38. The processor may also receive data and/or instructions via the transceiver. For example, the memory may be pre-loaded, or the processor may instruct the memory to save, data for creating and revising a contour map or other graphical representation of the land. Positional and/or distance data gathered at the target applicator 38 (see discussion below) may be combined with such mapping information to assist in the marking process. In embodiments including a communications transceiver, it is foreseen that all or some of the processing duties outlined throughout this disclosure may be outsourced to one or more remote processors—for example embedded in beam transmitter 14 and/or distal target 16—without departing from the spirit of the present inventive concept.

The target applicator 38 additionally includes a positional or distance measurement receiver 148 configured to receive a signal for processing to determine a distance and/or a position of the target applicator 38. The measurement receiver 148 includes photodiodes 150 configured to generate an electrical signal when impacted by a distance measurement beam (which may be emitted from the measurement receiver 148 in certain embodiments) which may be analyzed to determine a distance from an object from which the distance measurement beam was received.

The measurement receiver 148 is depicted mounted on a bracket comprising thin wires extending from plates bolted along handle 122. The measurement receiver 148 may be detachable from the handle 122 for receipt of the measurement signal. For example, the measurement receiver 148 may comprise a distance measurement device sold under the trademark Disto®, or another laser distance meter, without departing from the spirit of the present inventive concept. Alternatively, the measurement receiver 148 may be fixed to and/or embedded in the base 118.

The measurement receiver 148 may be configured to receive and analyze electromagnetic radiation emitted by the beam transmitter 14 to determine a distance therefrom, for example by measuring changes in one or more properties of beam 34 between the beam transmitter 14 and the target applicator 38 and/or by measuring time-of-flight. It is foreseen that data regarding the electromagnetic radiation gathered at the distal target 16 and/or known data regarding the distance between the beam transmitter 14 and the distal target 16 may be incorporated into such measurements and/or analysis to improve the accuracy of the output from the measurement receiver 148. It is also foreseen that an additional output optic may be added to the beam transmitter, the additional output optic being dedicated to emitting the electromagnetic radiation needed for measurement by the measurement receiver 148, particularly where beams 34 and/or 36 are not well-suited to such a purpose.

Alternatively or additionally, the measurement receiver 148 may receive and analyze a GPS location signal without departing from the spirit of the present inventive concept.

Analysis of data and/or signals from the measurement receiver 148 may occur in a processor embedded within the measurement receiver 148. The measurement receiver 148 may also or alternatively transmit the collected distance and/or positional data via a transmitter or transceiver to the processor of panel 146 and/or to a remote processor for analysis. Measuring distance of the target applicator 38 from the beam transmitter 14 or the distal target 16, for example, may help in marking locations along the ground surface above a "tee" or split in a utility line, particularly where such a split is known to be located a specified distance from the reference location on which the beam transmitter 14 or the distal target 16 is centered. For example, points at which gas utility lines branch may be particularly important to locate and mark, and such branching points may be at known distances from one or more landmark structures and/or reference locations such as valves or the like. Using the measurement receiver 148 or similar means to determine a distance from those landmark structures and/or reference location(s) may aid in quickly and accurately marking such branching locations.

The target applicator 38 may include a locking mechanism (not shown) for actuator 124. Preferably, the locking mechanism is controlled by instructions received from the processor of panel 146 and/or according to instructions received at the transceiver of panel 146. In an embodiment, the locking mechanism prevents depression of the actuator 124 to release markers from container 126 whenever time-stamped impact data from photodiodes 112 and 144 does not presently indicate the proper alignment of the beam 36 with distal target 16 and of at least a portion of beams 34 with the target applicator 38. It is foreseen that the locking mechanism may be engaged without consideration of beam 36 impact at distal target 16 without departing from the spirit of the present inventive concept. The locking mechanism may also be overridden by operator input at the panel 146 or by manual switch located preferably near actuator 124. Further, because of the near real-time usage of the data for controlling the locking mechanism as described herein, it is also foreseen that the beam impact data may not be "time-stamped" without departing from the spirit of the present inventive concept.

The target applicator 38 may also include means (not shown) for automatic adjustment of the orientation of marker dispenser 130. In such embodiments, left guard and right guard 134 are preferably removed or omitted. The means may include an electric motor fixed to base 118 and controlled by the processor of panel 146. The electric motor may have an output shaft fixed to a first stage drive gear, which may comprise a worm gear, a pinion gear, a spur gear, or the like. The first stage drive gear may be meshed with a drive chain comprising one or more cluster gears. An output gear of the drive chain may mesh with a gear that is integral with and/or fixed to a segment of the bracket 128. For instance, an arcuate segment of the bracket 128 may be integral with or fixed to an arcuate set of gear teeth meshed with the output gear. An imaginary circle formed based on the curvature of the arcuate segment may have a center defining a center axis about which the container 126 may be rotated to enable lateral adjustment of the dispenser 130 across the ground surface 12 to correct for perceived deviations from the lateral center line of the utility line 18.

The processor of panel 146 may control the automatic adjustment means. The processor of panel 146 may receive impact data from photodiodes 112 and/or 144 as well as target applicator 38 orientation data from a gyroscope mounted on the target applicator 38. The target applicator 38 may also include a distance-to-ground measurement device (not shown) in embodiments where wheel 136 is omitted or removed, with this device also providing its data to the processor of panel 146. Alternatively or in addition, a high accuracy GPS signal receiver may be embedded in the target applicator 38 near the marker dispenser 130, and may also transmit positional data to the processor of panel 146. Based on analysis of the aforementioned data, the processor of panel 146 may determine that the marker dispenser 130 has likely deviated from the lateral center line of the utility line 18, and may instruct the automatic adjustment means to move the dispenser 130 laterally (i.e., in a direction normal to the vertical reference plane) to adjust for the perceived deviation.

Turning now to embodiments of a method for marking ground surface 12 using system 10, a first reference location is determined. The first reference location serves as an endpoint for a marking route to be followed by target applicator 38, and is preferably centered laterally on the desired line to be marked. With respect to the embodiment of FIG. 1, the first reference location is centered on a lateral center line extending the length L of utility line 18, and more specifically coincides with the center of manhole cover 24. A second reference location is similarly located at an opposite endpoint for the marking route, coinciding with the center of manhole cover 26. Output optics 58, 60 are centered over the first reference location, and target surface 108 is centered over the second reference location. Feet 88 of transmitter and target stands 28, 30 may be firmly placed on the ground surface 12—in the illustrated embodiment, on the manhole covers 24, 26—following the aforementioned centering of the beam transmitter 14 and distal target 16.

Top surfaces 87 of the common segments of the transmitter stand 28 and target stand 30 may be vertically adjusted and leveled (in a horizontal plane normal to vertical axis V) by utilizing the hinges 84 to swing legs 80 and extending and/or retracting each leg 80 to an appropriate length. Levels 96, 98 are preferably consulted periodically throughout the vertical adjustment and leveling process to ensure proper leveling of the top surfaces 87. Columns 74 may additionally be extended or retracted for vertical adjustment of the beam transmitter 14 and distal target 16. The final heights of the beam transmitter 14 and distal target 16 are preferably at about the same elevation and present beam 36 at elevations above target applicator 38 and any obstacles that may be present along the ground surface 12.

The orientation of output optics 58, 60 and target surface 108 may also be adjusted to generally face one another. Each may be coarsely adjusted using lever release 68 to enable swiveling about vertical and horizontal axes, and may be secured following coarse adjustment by re-engaging lever release 68. The orientation of beam transmitter 14 and distal target 16 may be finely adjusted about vertical and horizontal axes using knobs 70, 72. Alignment sights 62 preferably are relied on to center beam 36 on target surface 108 during orientation adjustment, as described in more detail above.

Returning to FIG. 3, the horizontal axis described herein—about which the beam transmitter 14 is allowed to swivel—is preferably normal to the vertical reference plane in which the beams 34 are projected. This permits the beam transmitter 14 to pitch forward and backward while preventing a rolling motion that might inhibit emission of beams 34 within the vertical reference plane.

It is foreseen that the centering, leveling, vertical adjustment and orientation adjustment steps outlined above may be subdivided and/or performed in different permutations without departing from the spirit of the present inventive concept.

Following the centering, leveling, vertical adjustment and orientation adjustment steps outlined above, the beam 36 is essentially centered on target surface 108. In embodiments where beam 36 is one of beams 34 (e.g., where one output optic emits a single fan of beams 34 that include beam 36), the pitch of beam transmitter 14 is preferably adjusted to ensure a bottommost beam 34 projects sufficiently near the ground to impact the target surface 143 when the target applicator 38 is near the beam transmitter 14, as described below.

In certain embodiments, the impact of beam 36 at target surface 108 will generate audible and/or visible indicators, and may lead to transmission of beam impact data to the target applicator 38 throughout a marking process, as described in more detail above.

The target applicator 38 may be positioned between the beam transmitter 14 and distal target 16, preferably starting the marking route proximate the beam transmitter 14. The outer target surface 143 of target applicator 38 is substantially aligned in the vertical reference plane and is impacted by at least a portion of the beams 34. Impact by beams 34 is preferably detectable visually along the photosensitive surface portions of the target surface 143 and is also confirmed by audible or visual indicators issuing from panel 146, as described in more detail above. Photodiodes 144 and/or 112 preferably produce electrical signals for triggering the audible and/or visual indicators, and for disengaging the locking system for actuator 124, again as described in more detail above.

The target applicator 38 may be rolled on wheel 136 or otherwise moved along the ground surface 12 toward the opposite endpoint of the marking route, all the while maintaining lateral alignment between the target surface 143 and at least a portion of the beams 34. In the preferred embodiment, target surface 143 is substantially aligned along base 118 with panel 146. Panel 146 presents an uppermost edge 152 comprising the edge of the target applicator 38 that is furthest from the wheel 136. In the preferred embodiment, uppermost edge 152 remains below beam 36 as the target applicator 38 traverses the marking route in a substantially upright orientation. In this embodiment, the target applicator 38 does not interfere with the impact of beam 36 on distal target 16 during the marking process. In other embodiments—for example where an outer target surface presents the edge of the target applicator that is furthest from the wheel in the vertical reference plane—such furthest edge of the outer target surface is preferably maintained below beam 36 during the marking process.

At a plurality of points along the marking route, actuator 124 is depressed to cause dispensation of markers along the ground surface 12 via dispenser 130. In the illustrated embodiment, container 126 holds pressurized paint, and depressing actuator 124 causes actuator arm 132 to bend dispenser nozzle 130 with respect to the container 126, thereby releasing paint on the ground surface 12 in bursts to form markers therealong. It is noted that the actuator 124 may be prevented from depression by the locking mechanism described in more detail above, requiring the operator to correct misalignment of the target surface 143 and/or distal target 16 with the vertical reference plane before continuing and again being permitted to mark (though an override option may also be available, again as described above).

It is also noted that the lateral position of the dispenser 130 may be corrected during the marking process according to the description above. More specifically, the lateral position of the dispenser 130 may be automatically or manually adjusted based on all or some of the following information: beam impact data from photodiodes 112 and/or 144; target applicator 38 orientation data from a gyroscope mounted on the target applicator 38; target applicator-to-transmitter and/or target applicator-to-distal target distance data received from a wheel counter and/or distance measurement receiver 148; dispenser-to-ground distance data received from a distance-to-ground measurement device and/or calculated based on a constant dispenser-to-wheel distance and gyroscope data; and/or positional GPS data. Based on analysis of all or some of the aforementioned data, the processor of panel 146 (and/or a remote processor) may determine that the marker dispenser 130 has likely deviated from the lateral center line to be marked, and may display such data to the operator for manual adjustment and/or automatically instruct corrective lateral adjustment of the dispenser 130, as described in more detail above.

It is particularly noted here that the calculations above preferably take into account target applicator-to-transmitter distance data. More specifically, a presumed beam divergence factor is preferably input and/or stored in the memory of panel 146 (and/or remotely). For example, a divergence of 1.5 mRad may be assumed for beams emitted by certain green lasers that may be used in accordance with the present inventive concept. Taking system 40 as an example and assuming a transmitter-to-distal target distance of approximately five hundred feet (500'), the diameter of beam 44 may be presumed to be about nine to ten inches (9-10") larger at the distal target 16 than it is at the beam transmitter 42. Again, an acceptable lateral deviation of about two feet (2') from the lateral center line of utility line 18 may be presumed. Under these assumptions, deviation alerts and automatic corrections are likely to be much more sensitive to gyroscope data indicating vertical misalignment between target 48 and the marker dispenser when the target applicator 46 is nearer the distal target 16 than when it is nearer the beam transmitter 42. The settings for systems 10 and 40, and operational methods employed by an operator, may therefore be adjusted to account for beam divergence and similar imperfections observable based on the equipment employed in particular embodiments.

The system 40 may be used for marking ground surface 12 in substantially the same manner as described above in connection with system 10. However, single beam 44 may be emitted from beam transmitter 42 and aligned with both distal target 16 and target surface 50 of target applicator 46 throughout the marking process, as described in more detail above.

Embodiments of the present inventive concept therefore provide improved systems and methods for marking ground surfaces, for example above "untraceable" utility lines such as storm or sanitary sewer conduits. Proper alignment may be improved throughout the entire course of a marking process—and not merely during an initial setup—in a cost effective manner using embodiments of the present inventive concept. Moreover, embodiments of the present inventive concept include improved marking control systems and methods that are particularly useful with the handheld target applicators described herein.

It is within the capabilities of one having ordinary skill to select at least one acceptable material from which to construct each component described herein, based on review of this disclosure. Preferably, however, a casing for the beam transmitters is constructed of durable plastic and/or carbon fiber. The stands are preferably constructed of lightweight aluminum. The shaft of the target applicator is preferably an aluminum square tube. The bracket holding the marker container, the handle of the target applicator, and/or the pin holder tube may be constructed of plastic.

It should be noted that "ground surface" as used herein may refer to any surface extending between a transmitter and distal target, and therefore should not be limited to any particular material or combination of materials.

It is foreseen that the systems and methods described herein may be utilized in marking a variety of underground utility lines such as storm boxes, air release valves, curb stops, valves or the like, or for other purposes such as laying out fences, marking lines on playing fields, or the like, without departing from the spirit of the present inventive concept.

Having now described the features, discoveries and principles of the general inventive concept, the manner in which the general inventive concept is constructed and used, the characteristics of the construction, and advantageous, new and useful results obtained; the new and useful structures, devices, tools, elements, arrangements, parts and combinations, are set forth in the appended claims.

It is also to be understood that the following claims are intended to cover all of the generic and specific features of the general inventive concept herein described, and all statements of the scope of the general inventive concept which, as a matter of language, might be said to fall therebetween.

The invention claimed is:

1. A system for marking an underground utility line, comprising:
   a beam transmitter configured to emit electromagnetic radiation;
   a distal target oriented to be impacted along a first target surface by at least a first portion of the electromagnetic radiation, the distal target being mounted on a target stand configured for adjustment with respect to a vertical axis;
   a target applicator including—
      a second target surface;
      a base having a shaft; and
      a container attached to the base and configured to hold and dispense markers for placement along a ground surface that extends between the beam transmitter and the distal target.

2. The system of claim 1, wherein—
   the beam transmitter is configured to emit a second portion of the electromagnetic radiation in a plurality of divergent beams substantially collimated in a vertical reference plane;
   the beam transmitter includes a first output optic configured to emit the first portion of the electromagnetic radiation in a static reference beam;
   the beam transmitter is mounted on a transmitter stand configured for adjustment with respect to the vertical axis,
   the target applicator includes a wheel attached to the base proximate an end of the shaft and configured to support the base while rolling across the ground surface,
   the second target surface includes an uppermost edge,
   the beam transmitter and the distal target are adjusted and temporarily set such that the static reference beam is above the uppermost edge of the second target surface as the target applicator traverses the ground surface on the wheel during a marking process.

3. The system of claim 2, wherein—
   the target applicator has an uppermost edge furthest from the wheel,
   the target applicator traverses the ground surface during the marking process in an orientation that maximizes the elevation of the uppermost edge of the target applicator with respect to the vertical axis,
   the temporary setting of the beam transmitter and the distal target places the static reference line above the uppermost edge of the target applicator at all times as the target applicator traverses the ground surface during the marking process.

4. The system of claim 2, the beam transmitter further comprising a second output optic configured to emit the second portion of electromagnetic radiation such that the substantially vertical reference plane is substantially parallel to the static reference beam.

5. The system of claim 2, wherein the first output optic is configured to emit the second portion of the electromagnetic radiation.

6. The system of claim 1, wherein the beam transmitter is configured to emit at least a portion of the electromagnetic radiation in pulses.

7. The system of claim 6, wherein the beam transmitter is configured to alternatively emit the at least a portion of the electromagnetic radiation substantially continuously during the marking process.

8. The system of claim 1, wherein the beam transmitter is configured to emit at least a portion of the electromagnetic radiation substantially continuously during the marking process.

9. The system of claim 1, wherein—
   the beam transmitter is configured to emit at least a portion of the electromagnetic radiation in a static reference beam, the distal target is oriented to be impacted by at least a portion of the static reference beam, the static reference beam is substantially aligned with the first target surface and the second target surface as the target applicator traverses the ground surface during a marking process.

10. The system of claim 1, wherein the second target surface comprises a substantially translucent material.

11. The system of claim 1, wherein the second target surface comprises an aperture.

12. A target applicator for positioning between a beam transmitter that emits electromagnetic radiation and a distal target oriented to be impacted along a first target surface by at least a portion of the electromagnetic radiation, the target applicator comprising:

a second target surface;

a base having a shaft; and a container attached to the base and configured to hold and dispense markers for placement along a ground surface that extends between the beam transmitter and the distal target.

13. The target applicator of claim 12, further comprising— a handle extending from a first side of the shaft, a wheel attached to the base proximate an end of the shaft substantially opposite the handle, the wheel being configured to support the base while rolling across the ground surface, a marker dispenser configured to receive the markers from the container and to dispense the markers along the ground surface, wherein— the container and the marker dispenser are positioned along the first side, the second target surface is positioned along an opposite second side of the shaft.

14. The target applicator of claim 12, further comprising a distance measurement receiver configured to receive a signal for processing to determine a distance.

15. The target applicator of claim 14, wherein the distance measurement receiver comprises a GPS receiver and is configured to receive positional data.

16. The target applicator of claim 14, wherein the distance measurement receiver comprises a photodiode array.

17. The target applicator of claim 16, wherein the photodiode array is oriented to face the beam transmitter during a marking process.

18. The target applicator of claim 12, wherein the beam transmitter comprises a first optic configured to emit a static reference beam and a second optic configured to emit a plurality of divergent beams substantially collimated in a vertical plane.

19. A method for marking an underground utility line, comprising:

locating a first reference location along a ground surface above the utility line;

locating a second reference location along the ground surface above the utility line and spaced from the first reference location;

providing a beam transmitter configured to emit electromagnetic radiation;

placing the beam transmitter substantially above the first reference location;

providing a distal target including a first target surface, the distal target being mounted on a target stand configured for adjustment along a vertical axis;

placing the distal target substantially above the second reference location;

orienting the first target surface to face the beam transmitter;

adjusting the target stand with respect to the vertical axis until the first target surface is impacted by at least a portion of the electromagnetic radiation;

providing a target applicator having a second target surface;

placing the target applicator between the beam transmitter and the distal target;

aligning the second target surface with at least a portion of the electromagnetic radiation; and actuating a container to release a marker for placement along the ground surface.

20. The method of claim 19, comprising moving the target applicator toward the distal target while keeping the first target surface and the second target surface in alignment with respective portions of the electromagnetic radiation.

* * * * *